United States Patent [19]
Kawamura et al.

[11] Patent Number: 5,503,792
[45] Date of Patent: Apr. 2, 1996

[54] PROCESS OF EMBOSSING A PLASTIC WEB

[75] Inventors: Michio Kawamura; Masuo Kabutomori; Hiroyuki Tamaki, all of Shizuoka, Japan

[73] Assignee: Fuji Photo Film Co., Ltd., Kanagawa, Japan

[21] Appl. No.: 320,745

[22] Filed: Oct. 11, 1994

[30] Foreign Application Priority Data

Oct. 8, 1993 [JP] Japan .................................. 5-253145

[51] Int. Cl.[6] ................................................ B29C 59/04
[52] U.S. Cl. ................................................ 264/284
[58] Field of Search ........................................ 264/284

[56] References Cited

U.S. PATENT DOCUMENTS 4,234,300  11/1980  Yamagisi et al. .................. 264/284 X
4,304,750  12/1981  Pira et al. .............................. 264/284
4,942,000   7/1990  Penoyer .............................. 264/284 X
5,393,589   2/1995  Zeller et al. ....................... 264/284 X

FOREIGN PATENT DOCUMENTS 63-74850  4/1988  Japan .

*Primary Examiner*—Leo B. Tentoni
*Attorney, Agent, or Firm*—Sughrue, Mion, Zinn, Macpeak & Seas

[57] ABSTRACT

A plurality of embossing rollers different in circumferential arrangement pitch of uneven portions formed thereon for embossing are provided, and the embossing rollers are urged against an outer circumferential surface of a plastic web so that a plurality of stripes of embossed surface portions are formed on each of the opposite side edges of the plastic web, the embossed surface portions being different from each other in the arrangement pitch of uneven portions.

8 Claims, 5 Drawing Sheets

PROCESS OF EMBOSSING A PLASTIC WEB

BACKGROUND OF THE INVENTION

The present invention relates to an embossed plastic web in which, before a plastic web carried continuously is wound into a roll, embossing rollers having embossing uneven portions formed in their outer circumferences are pressed against side edge portions of the plastic web to form embossed surface portions of predetermined width respectively in the side edge portions of the plastic web along the carrying direction of the plastic web; and relates to a method and apparatus for performing embossing on such a plastic web.

As disclosed in Japanese Patent Unexamined Publication No. Sho-63-74850, when a plastic web (such as a photographic film support, a wrapping film, or the like) carried continuously is wound into a roll, embossing is performed on side edge portions of the plastic web to form uneven portions along the direction of carriage. This is to prevent widthwise displacement at the time of winding so as to improve the roll winding property, to ensure a space between plastic web overlaid by winding, and to improve the dealing property of the above-mentioned plastic web in the stage of working thereafter.

FIG. 7 shows a conventional example of an embossing finish apparatus for giving unevenness onto the opposite side edge portions of a thermoplastic resin film web carried continuously, when the film web is wound into a roll. In FIG. 7, the reference number 1 represents a winding shaft; 2, a take-up roll; 3, a film web carried continuously to be wound onto the take-up roll 2; 4, embossing rollers for performing unevenness onto the film web 3; 5, rubber rollers for holding the film web 3 in cooperation with the embossing rollers 4; and 6, embossed surface portions which are uneven portions formed on the film web 3 by the urging of the embossing roller 4 against the film web 3. The arrow A in the drawing shows the direction of carriage of the film web 3.

The embossing rollers 4 and the rubber rollers 5 are rotatably supported and positioned in such a manner that the outer circumferential surfaces of the embossing rollers 4 are urged against the film web 3 with predetermined pressing force so that the embossing rollers 4 rotate following the carriage of the film web 3.

A plurality of projection arrays 8 are formed on the outer circumferential surface of each of the embossing rollers 4 in such a manner that each of the projection arrays 8 is constituted by a plurality of projections formed at a constant pitch in the widthwise direction of the film web 3 and that the projection arrays 8 are formed equidistantly in the circumferential direction of the roller 4. (In most cases, each of the projections constituting the projection arrays 8 is shaped so as to be a frustum of a circular cone (circular cone with its head cut) as shown in FIG. 3. The shape is, however, not limited to this, but various shapes have been investigated.)

With the above configuration, the embossed surface portions 6 having the same outer circumferential shapes as those of the embossing rollers 4 are formed respectively on the opposite side edge portions of the film web 3 which has passed the embossing rollers 4.

In order to prevent the overlaid surface portions of the wound film web 3 on the take-up roll 2 from rubbing each other, it is preferable that uneven portions 9 of the embossed surface portions 6 formed by the embossing rollers 4, on the overlaid surface portions of the film web, are shifted from each other so that the uneven portions 9 may act as spacers to ensure a space S between the overlaid surface portions of the wound film web 3 as shown in FIG. 8.

Generally, however, the outer diameter of each of the embossing rollers 4 is smaller than the winding diameter of the film web 3 on the take-up roll 2. Accordingly, while the film web 3 is wound so that the surface portions of the film are overlaid on each other, the embossed surface portions 6 with the same pitch are repeated in the same circumferential surface, so that the uneven portions 9 of the embossed surfaces 6 of the film web 3 overlaid upon each other coincide with each other. In a conventional apparatus, in such a case, as shown in FIG. 9, the uneven portions 9 of the overlaid surfaces of the film web 3 fit in/on each other over a predetermined length in the circumferential direction so that the proper space S cannot be ensured. Accordingly, there has been a problem that rubbing-together between the overlaid surface portions of the film causes injuries or electric charges which may cause a trouble in secondary working, cause adhesion or wrinkles between overlaid portions of the film web 3, cause buckling of the uneven portions 9 fit in/on each other, and so on.

The above-mentioned Japanese Patent Unexamined Publication No. Sho-63-74850 teaches to make the array direction of the uneven portions 9 oblique relative to the film carriage direction. Since the same pitch is repeated in the circumferential direction even if the array direction is oblique, the uneven portions 9 fit in/on each other so that there is the same problem as that mentioned above.

SUMMARY OF THE INVENTION

It is therefore an object of the present invention to solve the foregoing problems, that is, to provide a plastic web, and a method and apparatus for performing embossing on such a plastic web, in which the positions of uneven portions in embossed surface portions formed in opposite side edge portions of on overlaid surface portions a plastic web are prevented from becoming coincident with each other, so that it is possible to avoid producing disadvantages such as wrinkles, buckling and so on caused by the rubbing-together or adhering between surface portions overlaid on each other.

The foregoing object of the present invention is attained by a method of performing embossing on a plastic web in which before a plastic web carried continuously is wound into a roll, embossing rollers having uneven portions formed in their outer circumferences are pressed against side edge portions of the plastic web to form embossed surface portions of predetermined width respectively in the side edge portions of the plastic web along a carrying direction of the plastic web; characterized in that embossed surface portions of a plurality of stripes different in arrangement pitch of uneven portions are formed in the side edge portions of the plastic web.

The foregoing object of the present invention is also attained by an apparatus for performing embossing on a plastic web in which before the plastic web carried continuously is wound into a roll, embossing rollers having uneven portions formed in their outer circumferences are pressed against side edge portions of the plastic web to form embossed surface portions of predetermined width respectively in the side edge portions of the plastic web along a carrying direction of the plastic web; characterized in that a plurality of rollers different in the circumferential arrangement pitch of embossing uneven portions are provided as the embossing rollers, whereby an embossed surface portion of a plurality of stripes different in arrangement pitch of uneven portions is formed in each of the side edge portions of the plastic web.

For example, the plurality of embossing rollers may be made identical in their roller outer diameter with each other, while they are made different in the number of the stripes of uneven portions provided in the circumferential direction for performing embossing to thereby make the uneven portions different from each other in their circumferential arrangement pitch.

The plurality of embossing rollers may be, for example, made different in their roller outer diameter, while they are made identical with each other in the number of uneven portions provided in the circumferential direction for performing embossing to thereby make the uneven portions different in their circumferential arrangement pitch.

Further, both the roller outer diameter and the number of uneven portions for embossing may be made different from each other to thereby make the uneven portions different from each other in their circumferential arrangement pitch.

According to the embossing method of the present invention, a plurality of uneven portions of an embossed surface portion formed on each of the opposite side edge portions of a plastic web are made different in their pitches. Accordingly, it is difficult to produce such a case where the positions of the uneven portions of the overlaid surfaces of the plastic web wound into a roll become coincident with each other. Accordingly, the embossed uneven portions formed on the opposite side edge portions of the plastic web can be made to act effectively as a spacer to ensure a proper space between the overlaid surface portions of the plastic web. Accordingly, it is possible to avoid producing disadvantages such as wrinkles, buckling and so on caused by rubbing-together or adhering between the overlaid surface portions of the plastic web.

In addition, according to the embossing apparatus of the present invention, it is possible to realize the above-mentioned embossing method. Further, since the embossing method can be realized only by providing a plurality of embossing rollers which are made different in the pitch of the uneven portions, there is no fear that the embossing apparatus becomes much more complicated than a conventional one.

According to the present invention, it is preferable to select the outer diameter of each embossing roller to be in a range of from 30 mm to 250 mm, and particularly preferably, in a range of from 100 mm to 200 mm, from the point of view of convenience in dealing and maintenance. Further, it is preferable to select the width of embossing to be in a range of from 3 mm to 15 mm, particularly preferably, in a range of from 8 mm to 12 mm.

According to the present invention, preferable pitch of uneven portions is 0.5 mm to 5 mm, and particularly 0.8 mm to 3 mm. Preferable height of uneven portions is different in accordance with the kind of material, the characteristic of dealing, and so on, and generally about 10% to 60% of the thickness of a web.

It is preferable to select the pressing force of the embossing rollers to form uneven portions in a plastic web to be in a range of from 5 kg to 70 kg, particularly preferably, in a range of from 20 kg to 40 kg, in the case of the above-mentioned respective regions of the embossing roller outer diameter, embossing width, and pitch.

According to the present invention, it is preferable to select the thickness of a plastic web to be in a range of from 10 μm to 300 μm.

A plastic web to which the present invention is to be applied is not limited specifically, but it is preferable that the plastic web has its glass-transition temperature (Tg) which is not lower than room temperature. For example, examples of such a plastic web include plastic film of thermoplastic resin such as polyethylene terephthalate (PET), cellulose acetate, cellulose nitrate, polycarbonate, polystyrene, nylon, and the like. There is no problem if these plastic webs have been subjected to surface treatment and surface coating which should not damage the characteristics of the plastic web. In the case where the present invention is applied to one in which an under coating layer is provided on a photographic film support, it is possible to prevent the film surface portions from adhering to each other.

As for heating condition at the time of finishing a plastic web, it is preferable to select the temperature to be in a range of from $Tg°$ C. to $(Tg+60)°$ C.

DETAILED DESCRIPTION OF THE PREFERRED EMBODIMENTS

An embodiment of an embossing finish apparatus of a plastic web according to the present invention will be described first prior to description about an embodiment of the method for performing embossing on a plastic web according to the present invention.

Figure 1:
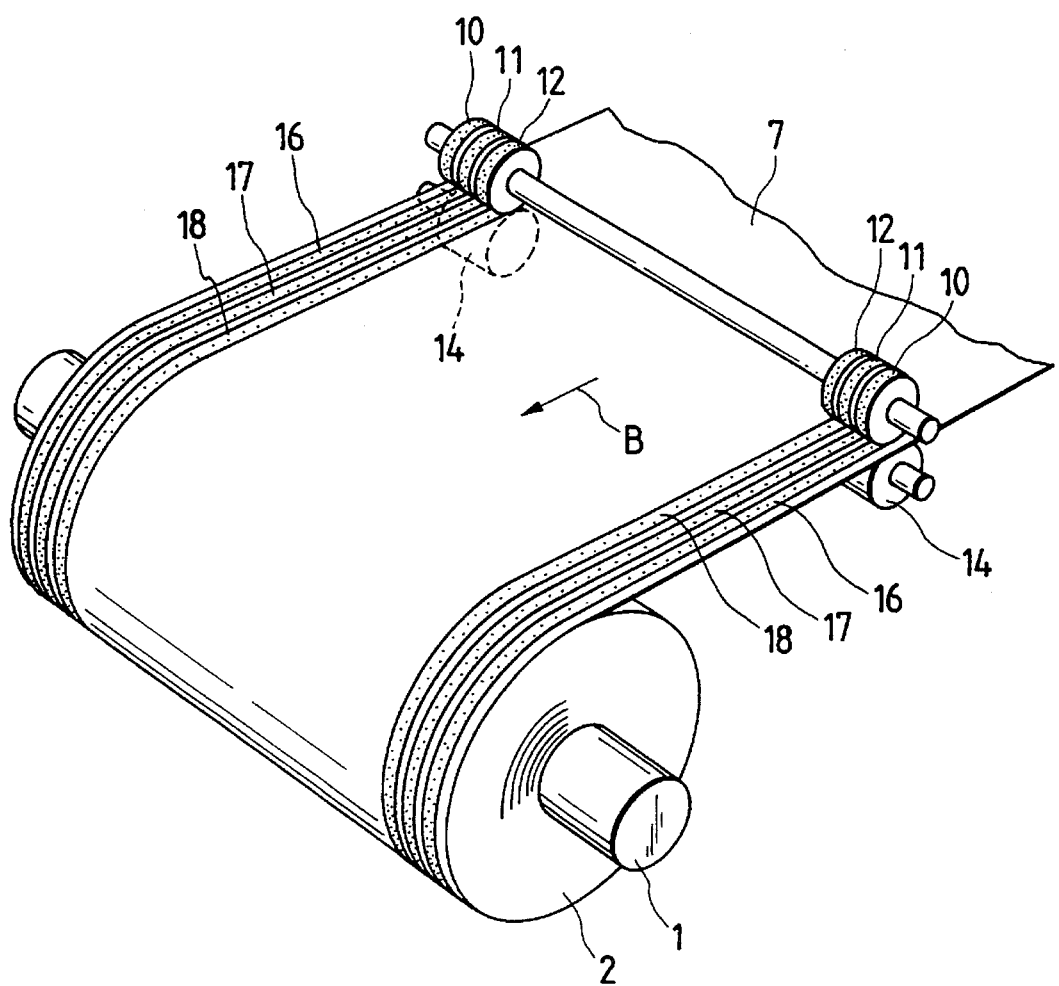
FIG. 1 is a perspective view of an embodiment of the present invention.

FIG. 1 shows an embodiment of the apparatus for performing embossing on a plastic web according to the present invention. In the drawing, the reference numeral 1 represents a winding shaft; 2, a take-up roll; 7, a plastic web carried continuously and wound by the take-up roll 2; 10 to 12, embossing rollers for forming uneven portions onto the plastic web 7; 14 rubber rollers for holding the plastic web 7 in cooperation with the embossing rollers 10 to 12; and 16 to 18 embossed surface portions which are uneven portions formed on the plastic web 7 by pressing of the embossing rollers 10 to 12 against the plastic web. The arrow B in the drawing shows the carriage direction of the plastic web 7.

The plastic web 7 is, for example, made of polyethylene terephthalate film of a thickness of 100 μm by biaxial stretching, which web will be subject to secondary working into a photographic film or the like.

Each of the embossing rollers 10 to 12 and the rubber rollers 14 are supported rotatably, and positioned so that the outer circumferential surfaces of the embossing rollers 10 to 12 press the plastic web 7 by predetermined pressing force (40 kg), and the embossing rollers 10 to 12 and the rubber rollers 14 rotate following the carriage of the plastic web 7.

The embossing rollers 10 to 12 are identical in their roller outer diameter with each other, while they are different in the number of stripes of uneven portions provided in the circumferential direction for performing embossing so as to make the uneven portions different from each other in their circumferential arrangement pitch. Specifically, the outer diameter of each of the embossing rollers 10 to 12 is selected to be 150 mm. The first embossing roller 10 has 182 projection arrays formed with equal pitches on the outer circumferential surface, each of the arrays having 3 projections in the width direction of the roller. The second embossing roller 11 has 191 projection arrays formed with equal pitches on the outer circumferential surface, each of the arrays having 3 projections in the width direction of the roller. The third embossing roller 12 has 200 projection arrays formed with equal pitches on the outer circumferential surface, each of the arrays having 3 projections in the width direction of the roller.

These numbers 182, 191 and 200 of the provided projection arrays are to be determined so that there is no common divisor between those of the three embossing rollers 10 to 12.

Figure 2:
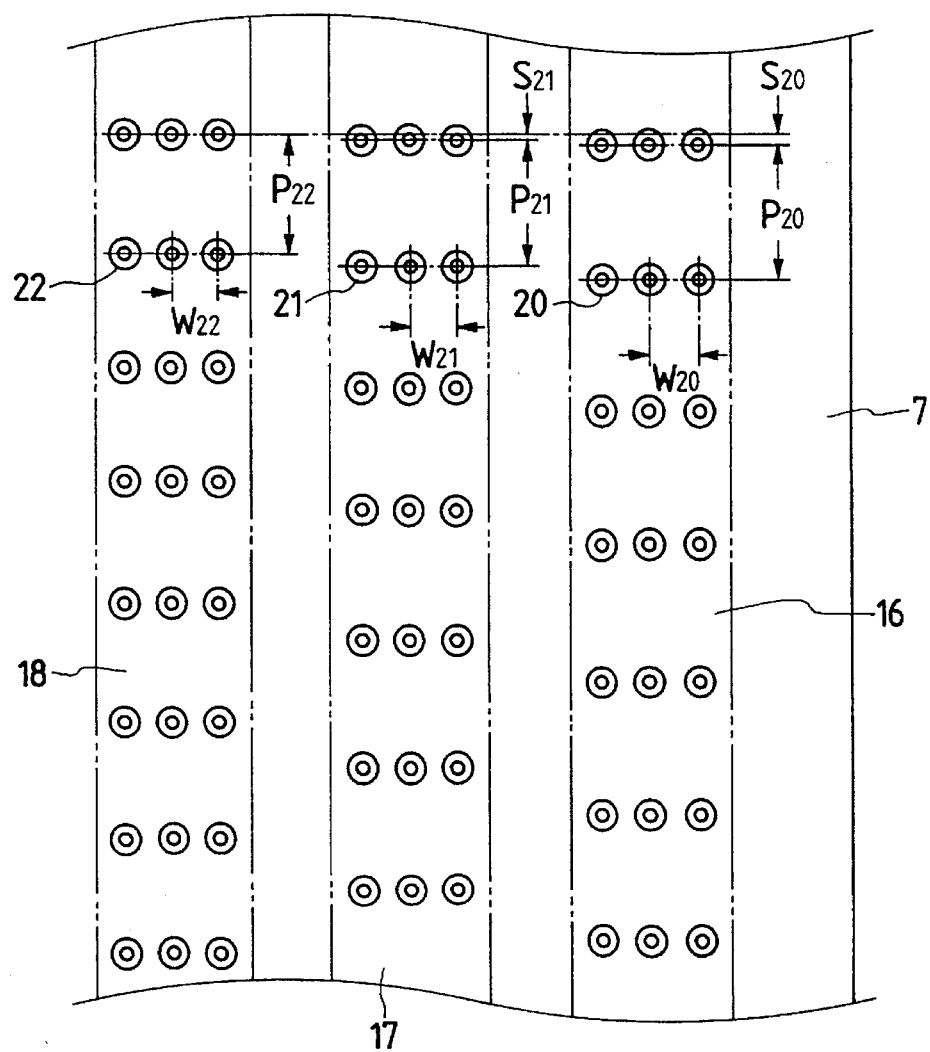
FIG. 2 is a partial plan view of the embossed part of the plastic web as the embodiment of the present invention.

FIG. 2 shows the state of uneven portions of the embossed surface portions 16 to 18 formed by the embossing rollers 10 to 12. Projection arrays 20 of the embossed surface portion 16 are formed by the projection arrays of the embossing roller 10. The pitch in the circumferential direction is designated by P20, and the pitch in the width direction of web (roller width direction) is designated by W20.

Projection arrays 21 of the embossed surface portion 17 are formed by the projection arrays of the embossing roller 11. The pitch in the circumferential direction is designated by P21, and the pitch in the width direction of web (roller width direction) is designated by W21. Projection arrays 22 of the embossed surface portion 18 are formed by the projection arrays of the embossing roller 12. The pitch in the circumferential direction is designated by P22, and the pitch in the width direction of web (roller width direction) is designated by W22.

In this embodiment, the pitches W20, W21 and W22 in the width direction are selected so as to be identical with each other. On the other hand, the pitches P20, P21 and P22 in the circumferential direction (moving direction of web) are different from each other because of difference in the arrangement pitches in the respective embossing rollers 10 to 12. In this embodiment, as for the circumferential pitch of uneven portions formed in the plastic web 7, the pitch in the widthwise outermost embossed surface portion is largest, while the pitch in the widthwise innermost embossed surface portion is smallest. However, the relationship of the size is not limited to this. For example, the reverse may be also established.

In FIG. 2, the reference numeral S21 represents a position gap between the projection arrays 22 and 21, and S20 represents a position gap between the projection arrays 22 and 20. Each of these position gaps S21 and S20 takes a value which is accumulated successively one by one until the value reaches the corresponding pitch in the circumferential direction.

Figure 3:
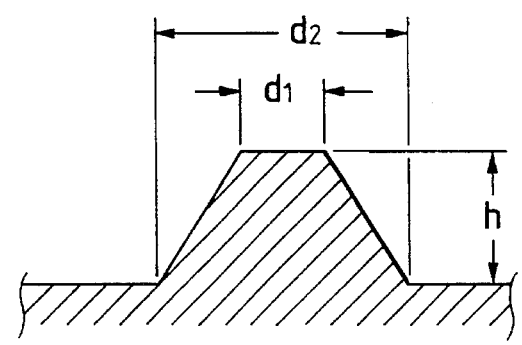
FIG. 3 is a cross sectional view of a projection in the embodiment of the present invention.

Each of the projections constituting the projection arrays of the embossing rollers 10 to 12 is made to have a shape of a frustum of a circular cone as shown in FIG. 3. The diameter d1 of the top portion of this frustum of circular cone, the diameter d2 of the skirt portion, the height h and so on are selected in accordance with the thickness of the plastic web 7 and so on.

In the embossing method according to the embodiment of the present invention, by using the apparatus shown in FIG. 1, the shapes of the uneven portions of the respective embossing rollers 10 to 12 are transferred to the opposite side edge portions of the plastic web 7 to be wound by the take-up roll 2 so that three stripes of the embossed surface portions 16 to 18 which are different in pitch in the moving direction of the plastic web 7 are formed in each of the opposite side edge portions.

At the time of performing embossing by means of the respective embossing rollers 10 to 12, portions to be treated of the plastic web 7 are heated in advance, or the embossing rollers 10 to 12 are heated in advance. By performing working in such a heated state, the working can be made easily, and the secular change of formed uneven portions becomes small. In the case of giving uneven portions with the above-mentioned pitch to the plastic web 7 of polyethylene terephthalate, it is preferable to perform the working after at least either the plastic web 7 or the embossing rollers 10 to 12 is heated to 100° C.

In embossing according to the embodiment which has been described above, the pitches of uneven portions of the three embossed surface portions 16 to 18 formed in each of the opposite side edge portions of the plastic web 7 are different from each other, so that such a case where the positions of the uneven portions of the overlaid surface portions of the plastic web 7 wound on the take-up roll 2 become coincident with each other hardly occurs. Accordingly, the embossed uneven portions formed in the opposite side edge portions of the plastic web 7 act effectively as a spacer to ensure a space between the overlaid surface portions of the plastic web 7. Accordingly, it is possible to avoid producing disadvantages caused by the rubbing-together or adhering between the overlaid surface portions of the plastic web 7. In addition, there is no fear that the apparatus becomes more complicated than a conventional one.

In the above-mentioned embodiment, the three embossing rollers 10 to 12 for forming the three stripes of embossed surface portions 16 to 18 which are different in arrangement number of the uneven portions are made identical with each other in their roller outer diameter, while made different from each other in the circumferential arrangement number of the embossing uneven portions to thereby make the uneven portions different from each other in their circumferential arrangement pitch.

Figure 4:
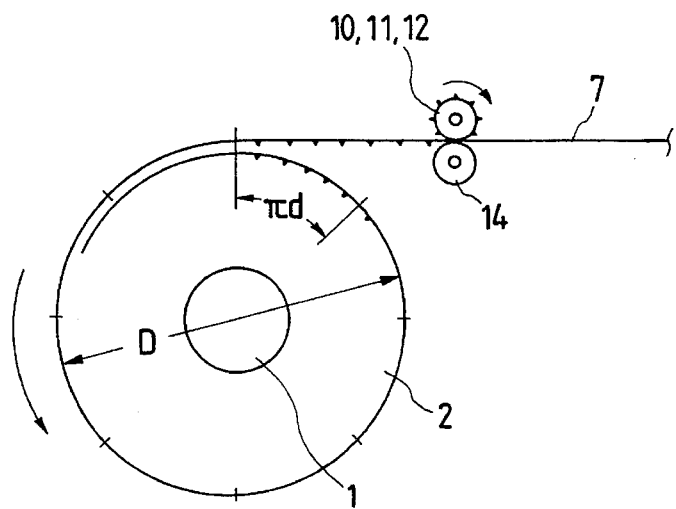
FIG. 4 is an operation explanatory side view of an embossing finish apparatus as the embodiment of the present invention.

In this embodiment, as shown in FIG. 4, there occurs a case where the uneven portions of the overlaid surface portions becomes coincident at a portion every time the condition D=nd (n is a positive integer) is satisfied in the relationship between the outer diameter d of the embossing rollers 10 to 12 and the winding diameter D of the film web 7, but the frequency of such coincidence of the overlaid uneven portions is reduced on a large scale in comparison with the case of a conventional method. It is probable in a conventional method that such coincidence of the overlaid uneven portions occurs once or several times within a range of one circumferential surface of the take-up roll 2. In the above-mentioned structure, such coincidence of the overlaid uneven portions does not occur for a long time after it has once occurred. That is, the frequency of occurrence of coincidence of the overlaid uneven portions is reduced on a large scale.

When coincidence of the uneven portions once occurs, an area where uneven portions become coincident occurs in the circumferential direction by slight length, but such an area of coincidence does not continue for a long time since the radius of curvature changes because of the thickness of the plastic web 7, and the arrangement pitches of the uneven portions are made different. Accordingly such a frequency and length of occurrence of coincidence give no problem in practical use.

A second embodiment of the present invention will be described.

Figure 5:
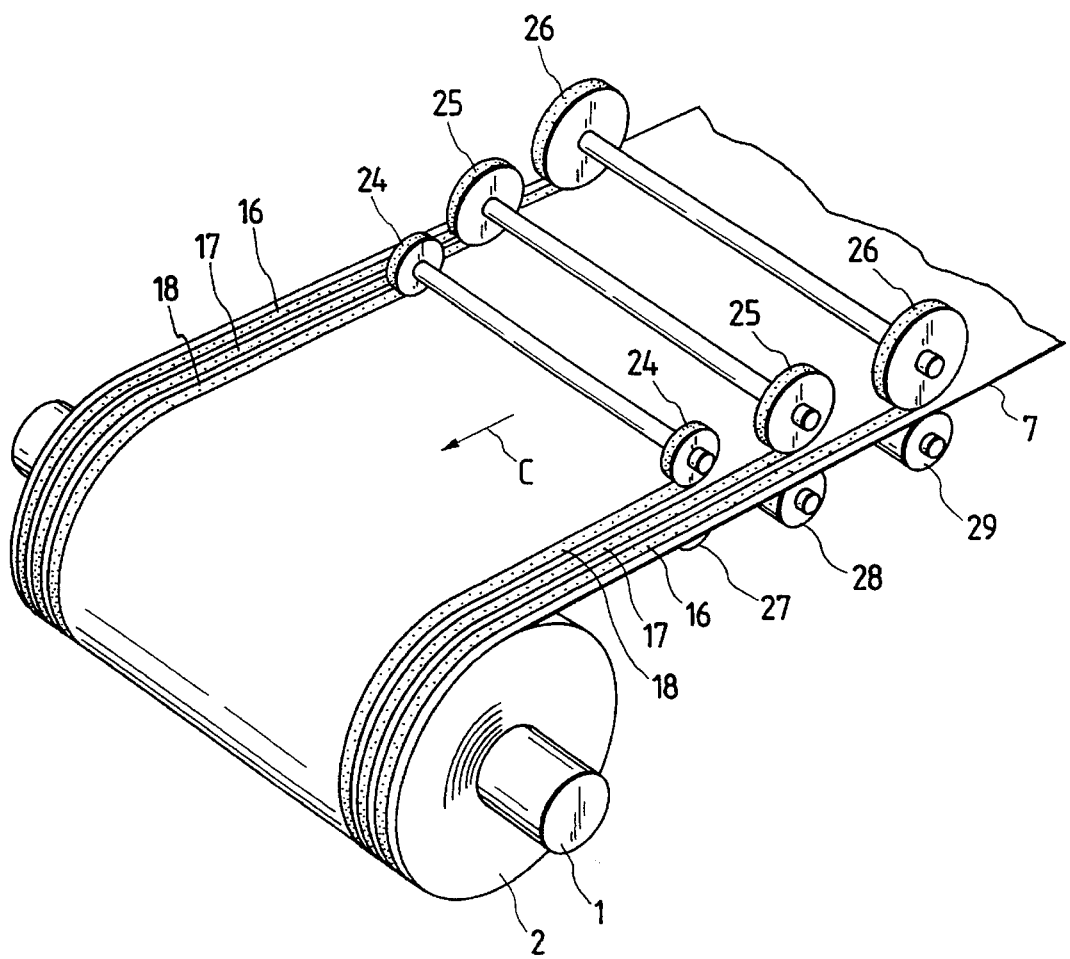
FIG. 5 is a perspective view of a second embodiment of the present invention.
Figure 6:
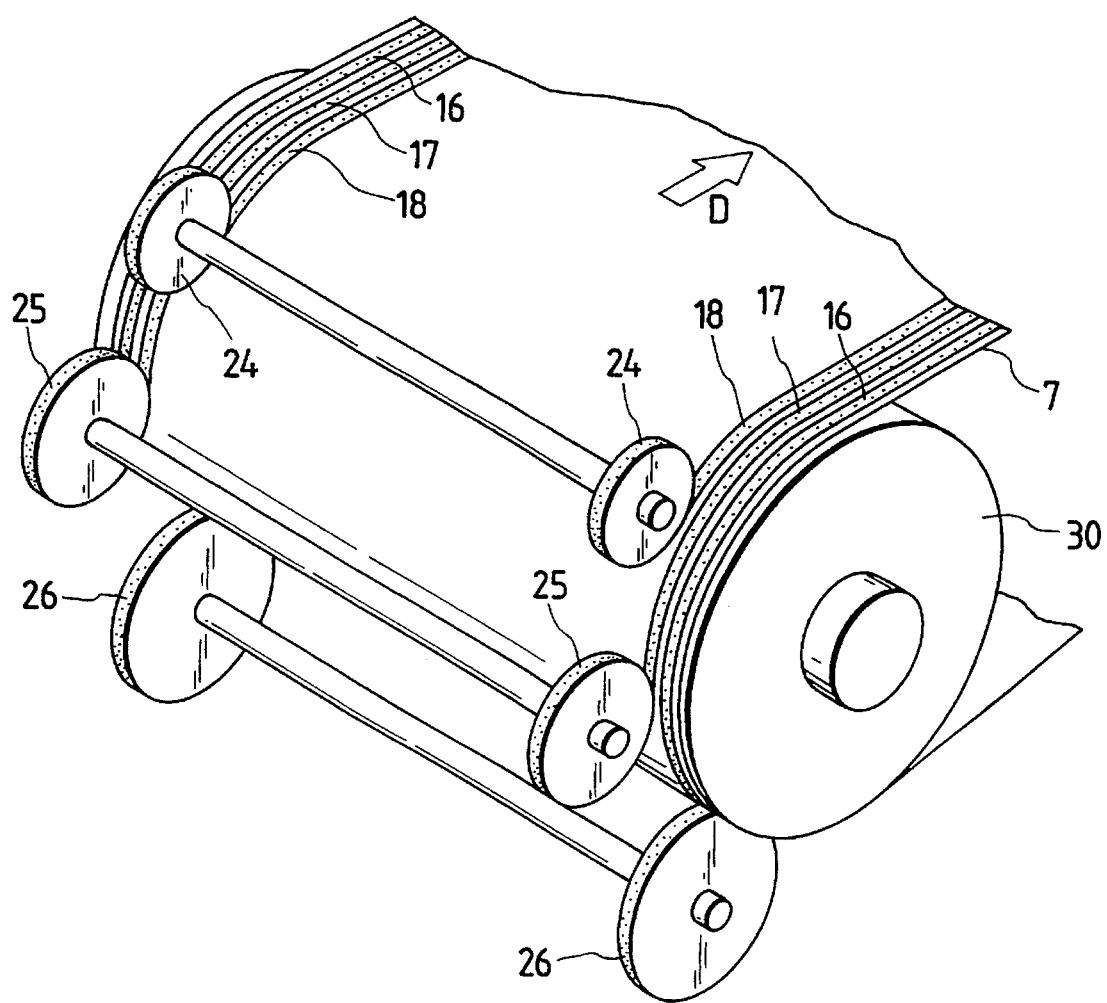
FIG. 6 is a perspective view of a third embodiment of the present invention.
Figure 7:
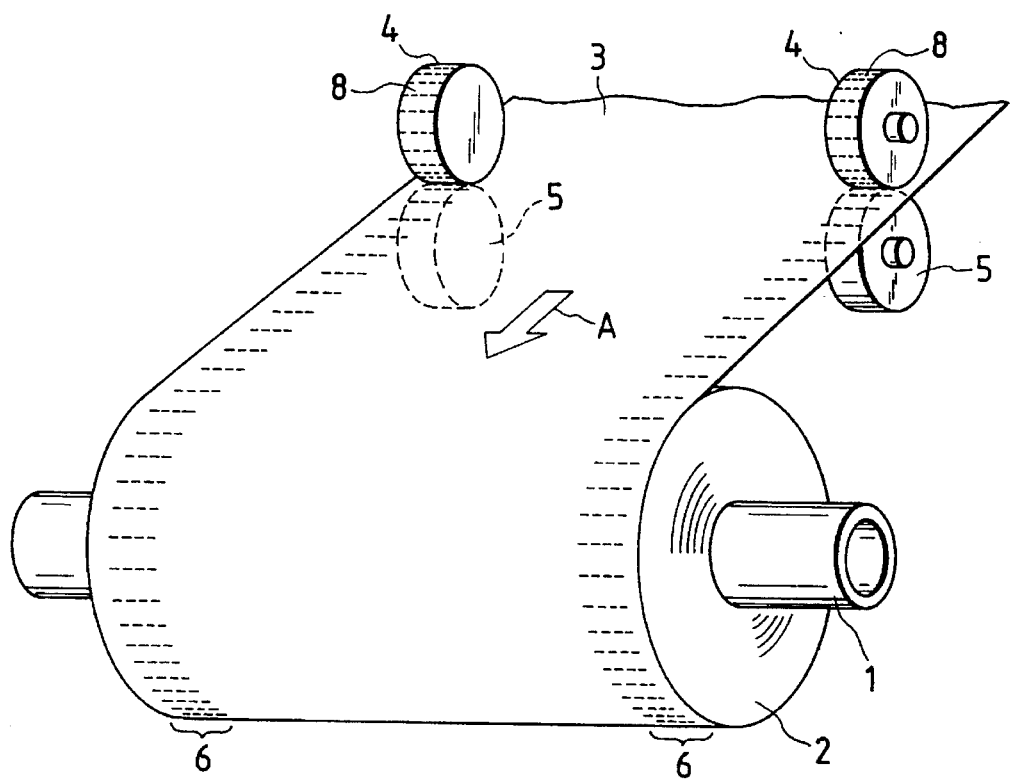
FIG. 7 is a perspective view of a conventional embossing finish apparatus.
Figure 8:
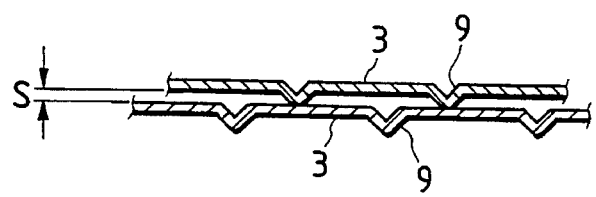
FIG. 8 is an explanatory partial side view of a proper state of embossed plastic web overlaid upon each other.
Figure 9:
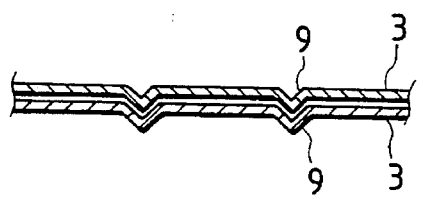
FIG. 9 is an explanatory partial side view of a bad state of embossed plastic web overlaid upon each other.

As shown in FIG. 5, three embossing rollers 24 to 26 for forming three stripes of embossed surface portions different in pitch of uneven portions provided in each of the opposite side edge portions of a plastic web 7 may be made different from each other in roller outer diameter, while made identical with each other in the circumferential arrangement number of embossing uneven portions to thereby make the above-mentioned circumferential arrangement pitch of the uneven portions different. In FIG. 5, the arrow C shows the moving direction of the plastic web 7, and the reference numerals 27 to 29 represent rubber rollers associated with the corresponding embossing rollers 24 to 26.

The embossing rollers 24 to 26 are disposed to be shifted in the width direction of the plastic web 7 by the roller width respectively, and the embossing rollers 24 to 26 form embossed surface portions different in pitch of uneven portions.

In the embodiment shown in FIG. 5, each of the embossing rollers 24 to 26 has 200 projection arrays with equal pitches in the circumferential direction, each of the arrays having a plurality of projections in the roller width direction. The outer diameter of the first embossing roller 24 is 150 mm. The outer diameter of the second embossing roller 25 is 160 mm. The outer diameter of the third embossing roller 26 is 170 mm. Also in this embodiment, the pitch of the uneven portions in the widthwise outermost surface portion is largest, while that in the widthwise innermost surface portion is smallest. However, the relationship of size of the pitches of uneven portions assigned to the respective arrays is not limited to this.

In this case, the positions of the uneven portions of embossed surface portions formed in the opposite side edge portions of plastic web 7 become coincident with each other between overlaid surface portions of the plastic web 7 wound on the take-up roll 2 when the winding diameter of one circumference on the take-up roll is equal to an integer multiple of the minimum common multiple 4080 of the outer diameters of the respective embossing rollers 24 to 26. The winding diameter used practically is about 1,500 mm to 2,000 mm in its maximum. Accordingly, in practical use, it is possible to perfectly prevent such a case where the positions of the uneven portions of respective embossed surface portions of the plastic web 7 become coincident with each other between overlaid surface portions of the plastic web 7.

Accordingly, the embossed uneven portions formed at the opposite side edges on the overlaid surface portions of the plastic web 7 can be made to act effectively as a spacer to ensure a proper spacer between the overlaid surface portions of the plastic web 7, so that it is possible to avoid producing disadvantages caused by rubbing-together or adhering between the overlaid surface portions of the plastic web 7.

Next, a third embodiment of the present invention will be described.

In this third embodiment, the three rubber rollers 27 to 29 in the second embodiment are replaced by a common rubber roller 30. The respective embossing rollers 24 to 26 are disposed along the circumferential surface of the common rubber roller 30. The embossing rollers 24 to 26 holds the plastic web 7 between themselves and the rubber roller 30 so as to perform embossing. The plastic web 7 is carried in the direction shown by the arrow D.

As for the order of disposing a plurality of embossing rollers in the moving direction of web in the above second and third embodiments, the reverse may be adopted.

Although the three embossing rollers 10 to 12 different in circumferential arrangement pitch of the uneven portions for performing embossing are used for each of the opposite side edge portions of the plastic web 7 in each of the above embodiments, the number of embossing rollers to be used is not limited to the above-mentioned embodiments. Two embossing rollers may be used for each of the opposite side edge portions of the plastic web so that two stripes of embossed surface portions along the moving direction of the plastic web are formed in each of the opposite side edge portions of the plastic web 7. Alternatively, four or more embossing rollers may be used so that so many stripes of embossed surface portions along the moving direction of the plastic web are formed in each of the opposite side edge portions of the plastic web 7.

In order to make the circumferential arrangement pitch of the uneven portions different from each other, such a configuration in which a plurality of embossing rollers are made different in their outer diameter as well as in the arrangement number of the embossing uneven portions of the respective embossing rollers may be used.

It can be also considered that the embossing uneven portions formed on the outer circumferential surfaces of the respective embossing rollers are made different from each other not only in the circumferential arrangement pitch but also in the pitch in the widthwise direction of the rollers.

Although each projection array formed on each of the embossing rollers has three projections of frustums of circular cones formed at constant pitches in the roller widthwise direction in this embodiment, the number of projections constituting each projection array may be selected freely, and is not limited to that shown in the above-mentioned embodiment. In addition, the shape of each projection is not limited to that of the above-mentioned embodiment, and may be a frustum of a pyramid, a curved shape, or a semi-sphere.

According to the method of performing embossing on a plastic web of the present invention, the uneven portions of a plurality of embossed surface portions formed in each of the opposite side edge portions of the plastic web are made different in pitch from each other. Accordingly, such a case where the positions of the uneven portions of the overlaid surface portions of the plastic web wound on the take-up roll become coincident with each other hardly occurs. Accordingly, the embossed uneven portions formed in the opposite side edge portions of the plastic web act effectively as a spacer to ensure a space between the overlaid surface portions of the plastic web. Accordingly, it is possible to avoid producing disadvantages such as wrinkles, buckling or the like caused by the rubbing-together or adhering between the overlaid surface portions of the plastic web.

In addition, according to the embossing apparatus of the present invention, it is possible to realize the above-mentioned embossing method. Further, since the embossing method can be realized only by providing a plurality of embossing rollers which are made different in the pitch of the uneven portions, there is no fear that the embossing apparatus becomes much more complicated than a conventional one.

What is claimed is:

1. A method of performing embossing on a continuously carried plastic web in which, before the plastic web is wound into a roll, embossing rollers having embossing portions formed in their outer circumferences are pressed against side edge portions of the plastic web to form embossed surface portions of predetermined width respectively in the side edge portions along a moving direction of the plastic web, the embossed surface portions comprising a plurality of uneven portions in the web, said method comprising:

forming the embossed surface portions as a plurality of stripes, and forming the uneven portions with a different arrangement pitch for each stripe.

2. A method as recited in claim 1, wherein the arrangement pitch is different in a circumferential direction of the embossing rollers.

3. A method as recited in claim 1, wherein the arrangement pitch is different in a widthwise direction of the embossing rollers.

4. A method as recited in claim 1, wherein the arrangement pitch is different in both a widthwise and a circumferential direction of the embossing rollers.

5. A method of performing embossing on a plastic web which is to be wound around itself into a roll, said method comprising:

moving the web continuously; and pressing a plurality of equal diameter embossing rollers against at least one side edge portion of the plastic web to form uneven portions in stripes on the web, each one of said equal diameter embossing rollers having a different number of embossing portions, so as to form the uneven portions at different arrangement pitches for each of the stripes.

6. A method of performing embossing on a plastic web which is to be wound around itself into a roll, said method comprising:

moving the web continuously; and pressing a plurality of different diameter embossing rollers against at least one side edge portion of the plastic web to form uneven portions in stripes on the web, each one of said different diameter embossing rollers having an equal number of embossing portions, so as to form the uneven portions at different arrangement pitches for each of the stripes.

7. A method as recited in claim 6 wherein, in said pressing step, each one of the plurality of different diameter embossing rollers is pressed against a respective support roller positioned on an opposite surface of the web from the embossing rollers.

8. A method as recited in claim 6 wherein, in said pressing step, the plurality of different diameter embossing rollers are all pressed against a single support roller positioned on an opposite surface of the web from the embossing rollers.

* * * * *